June 16, 1925.
W. L. WRIGHT
ART OF RENDERING PAPER IMPERVIOUS
Filed April 10, 1920
1,542,539
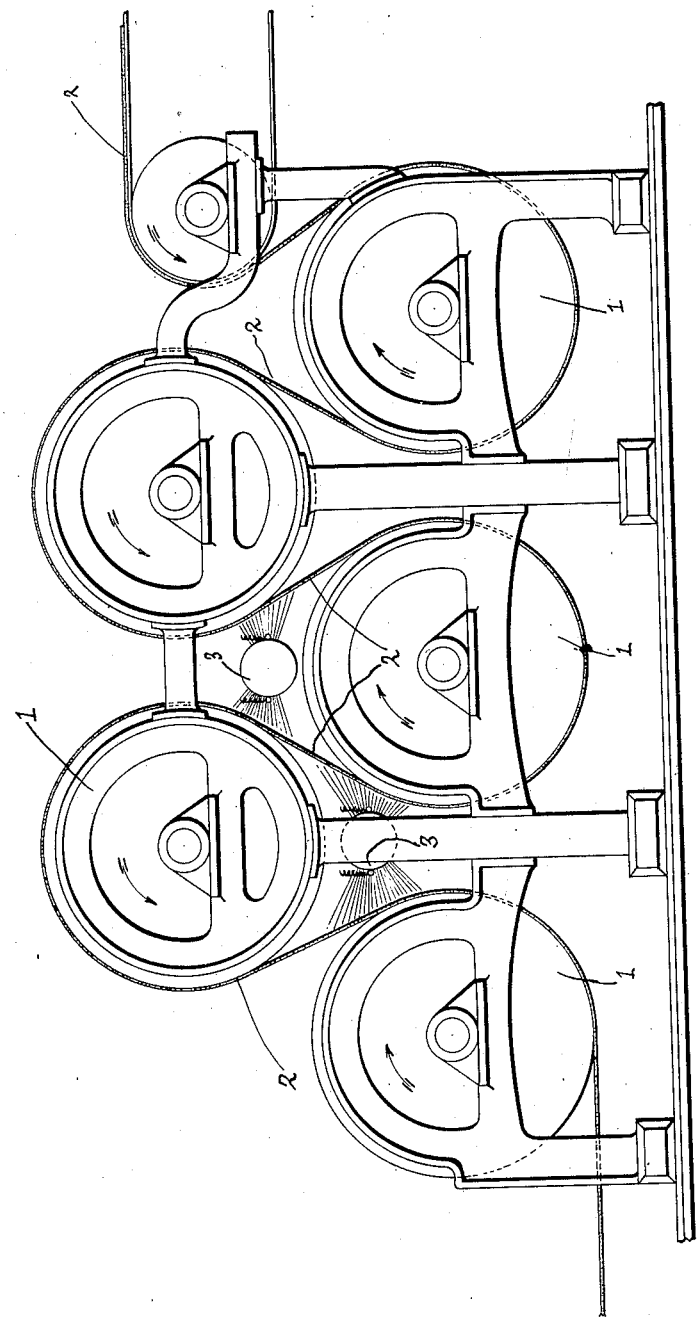

Patented June 16, 1925.

1,542,539

UNITED STATES PATENT OFFICE.

WILBUR L. WRIGHT, OF FULTON, NEW YORK, ASSIGNOR TO OSWEGO FALLS CORPORATION, OF FULTON, NEW YORK, A CORPORATION OF NEW YORK.

ART OF RENDERING PAPER IMPERVIOUS.

Application filed April 10, 1920. Serial No. 372,952.

*To all whom it may concern:*

Be it known that I, WILBUR L. WRIGHT, a citizen of the United States, and resident of Fulton, county of Oswego, State of New York, have invented certain new and useful Improvements in and Relating to the Art of Rendering Paper Impervious, of which the following is a specification.

This invention relates to the art of rendering fibrous material impervious; and the objects and nature of the invention will be readily understood by those skilled in the art in the light of the following explanations of what I now believe to be the preferred methods of practicing my invention.

I have discovered that paper and like sheet material can be quickly rendered impervious to water and grease-like substances, or can be waterproofed, on a commercial or successful manufacturing basis, by subjecting such material to the action of violet or ultra violet light artificially produced where such material carries or has incorporated therein a suitable chemical or chemical compound the nature of which is quickly changed within the material by such light in such manner as to impart to the material the peculiar characteristic sought. And with this end in view, my invention among other features, is based on the utilization of artificially produced violet or ultra violet light in connection with suitable chemical or chemicals, for waterproofing paper or for rendering paper and the like impervious.

Referring to the accompanying drawing, forming a part hereof:

The single view is a side elevation conventionally or diagrammatically illustrating part of a paper making machine equipped with sources of artificial violet or ultra-violet light, or both, in accordance with my invention.

The chemical salt solution employed is preferably in the form of a gelatinous liquid (what might be termed a chromate gelatinous solution) that is impregnated with the chemical salt, or that contains a sufficient percentage of chemical salt to render the gelatine-like substance impervious when dried or set, after the chemical salt solution or composition has been rendered insoluble by the action of said light rays.

Paper impervious to water and grease can be produced by treating finished paper with said solution and then exposing the same to light, or the fibrous material or stock employed in the manufacture of paper, can be subjected to the solution and exposed to light during the process of producing paper so that the resulting finished paper product, will be impervious.

Various substances can be utilized for the purposes of my invention, although I prefer to employ such of the chromates as are adapted for my purposes, for instance, such as chromate of potash, chromate of soda, chromate of alumina, or the bichromates thereof. The solution also embodies a suitable body or carrier for the chemical salt, and for this purpose I preferably employ a soluble gelatinous substance that will be rendered insoluble by the presence of salt therein under the action of violet or ultraviolet light rays. Gelatine can be employed as the body or carrier, but I have discovered that casein is adapted for this purpose and possesses certain advantages over gelatine.

However, various adhesives or gums can be employed for this purpose, nor do I wish to limit my invention to the use of adhesives for this purpose, and I herein employ the term "gelatinous" in a broad and generic sense to include all materials adapted for my purposes, as I claim to be the first to utilize ultra violet or violet light rays in water and grease proofing paper.

It is also usually desirable to employ an ingredient to increase the pliability or flexibility of the finished impervious paper to reduce to the minimum any tendency of the paper (or the impervious barrier thereon and therein) to crack or break where bent or folded. Various substances can be employed for this purpose. For instance, I can employ glycerine, although at present I prefer to employ emulsified cocoanut oil where such flexibility ingredient is desirable. However, I do not wish to so limit my invention.

The solution usually employed is composed of a casein solution, emulsified cocoanut oil, and a suitable chromate such as bichromate of potash, although I do not wish to so limit my invention.

This solution can embody water about in the proportion of 4000 parts by weight; casein about 200 parts; ammonia about 20 parts; cocoanut oil about 30 parts; and a solution of (any) bichromate of potash (of about one part bichromate to ten parts water) 120 parts, although these proportions can be varied within wide limits or extremes.

The casein is dissolved in the ammonia diluted by water. The casein solution is usually formed in the presence of heat. The resulting product is then usually forced through a fine screen and diluted by the addition of water, and to this is added the bichromate of potash solution, and the oil or glycerine.

Where my method is employed in the process of manufacturing paper, the chromate-gelatinous solution is added to the ground wood pulp, the sulphite wood pulp, or other fibrous material or paper stock, usually by being introduced into the beater.

The proportion of chromate-gelatinous solution added to the beater with respect to the pulp therein, is usually about the same as commonly followed where sizing is added to the pulp in the beater, and as is well known to those skilled in the art this proportion varies within wide limits. In the beater, the stock or pulp is thoroughly beaten up and mixed with the solution so that the fibres become approximately saturated with and coated by the solution.

The paper making process then proceeds as usual through paper making machinery, or in any other desirable manner.

At suitable points where the web of damp pulp or fiber is passing over or between squeeze and drying rolls, I subject the same to light from any suitable source that artificially generates the rays possessing the quality of converting the gelatinous chromate composition in the paper to the insoluble state, as hereinbefore described.

According to my present understanding, the invisible ultra violet rays act with great rapidity in thus converting said salts, and also the violet rays although not so rapidly as the ultra violet rays. Various lamps or lights generate the rays that are capable of converting the salts to the insoluble state in accordance with my invention. However, at present, I believe the so-called "quartz" electric light or lamp of commerce to be the best adapted for my purposes because of the violet and ultra violet rays generated thereby. This lamp is now used for sterilizing purposes, particularly for sterilizing water and in medical practice for certain curative purposes. These rays generated by this lamp quickly convert the chemical salt composition on and within the traveling pulp web, to the insoluble state, without materially slowing up the manufacture of the paper as commonly practiced. The manufacture of the paper can proceed continuously as usual, and while the paper is thus being made, my invention can be practised to render such paper grease and water proof.

These electric lamps are preferably so arranged that both sides of the traveling fiber web are exposed to the light rays. Usually, the lamps are so arranged as to subject the damp fiber web to the light as the web passes from the last squeeze rolls to the drying rolls, although I do not wish to so limit my invention, as it is possible to attain the desired results where the web is exposed to the light at other points in its passage through the paper making machinery.

In the accompanying drawing, I more or less conventionally illustrate part of a paper making machine embodying any suitable system of rolls, such as drying rolls or the like 1, by which the damp fibre or paper web 2, is advanced. I show this portion of the paper making machine equipped with artificial sources 3 of the peculiar light required, i. e. violet or ultra violet light or both. For this purpose I diagrammatically illustrate two quartz or other lamps 3 for the production of violet or (and) ultra violet light or rays and these lamps are so arranged that one side of the traveling damp paper web is directly exposed to one lamp 3, and the other side of said web is directly exposed to the other lamp 3, although I do not wish to so limit all features of my invention.

Also, the finished paper can be subjected to the light after it leaves the paper making machinery instead of while passing through the machinery in the unfinished state. However, I prefer to complete the waterproofing process while the paper is in the unfinished state on its way through the paper making machinery as additional handling and machinery are thereby avoided, and the paper is rendered impervious as it is made without interrupting or interfering with the paper making process which proceeds continuously as usual.

It will be noted, however, that I enclose or cover the beater or other receptacle in which the fiber or paper is saturated with the chromate solution, to approximately exclude light.

Where finished paper is to be rendered impervious, I pass the paper through a bath of the chromate-gelatinous solution (protected from light) so that the paper becomes thoroughly saturated therewith. The paper is then passed from the bath through squeeze rolls, and therefrom to drying rolls, and before it reaches the drying rolls, the paper is exposed to the light from suitably located electric or other lamps that generate the violet and ultra violet rays, to quickly convert the salts and gelatinous body to the insoluble state.

While the chromate-gelatinous solution is in the beater or forms the bath, I protect the solution from light and also preferably keep the solution heated to a temperature not to exceed approximately one hundred and seventy five degrees Fahr.

While my method can be carried out by exposing the fiber saturated with the chromate-gelatinous solution to sunlight yet the action of the sun in converting the salts to the insoluble state is very slow, and the same slow action takes place under the action of rays from various sources of artificial light. However, the salts are quickly converted under the action of the ultra violet rays generated by various electric lamps particularly by the quartz lamp of commerce.

I do not wish to limit myself to the particular chromate gelatinous solution hereinbefore described, nor to the ingredients and proportions mentioned and it is evident that various departures and variations might be resorted to without departing from the spirit and scope of my invention.

Desiring to protect my invention in the broadest manner legally possible, what I claim is:—

1. Paper material embodying, and rendered grease and water proof by, a casein-chromate composition.

2. The method of providing a barrier against the passage of grease and water through paper and fibrous material, which involves the steps of subjecting the material to a composition that will react under the action of certain light rays to change the composition to the insoluble state, and thereafter exposing the material carrying the composition to said light rays generated by a quartz lamp.

3. In the method of producing impervious paper material, those steps which consist in applying to the paper material a substance or substances that quickly react under the action of violet or ultra-violet rays to render such paper material impervious, and thereafter exposing such material to the direct action of artificially produced violet or ultra-violet rays.

4. In the method of rendering paper material and the like impervious, those steps which consist in incorporating in the paper material a solution that will impart to such material the characteristic of becoming impervious by exposure to violet or ultra violet rays, and then subjecting such paper material to the direct action of artificially produced violet or ultra-violet light.

5. Sheet paper impregnated with an impervious insoluble composition embodying a chromate or its equivalent, a vegetable oil and a body or carrier, that will react with the chromate in paper under the action of light rays.

6. In the method of rendering paper impervious, those steps which consist in providing the paper material with a composition that reacts within such material under the action of violet or ultra-violet light to render such material impervious, and thereafter propelling such treated material while damp and in sheet or web form past a violet or ultra-violet light lamp and exposing the damp traveling sheet to the direct action of such light.

7. Apparatus for the production of impervious paper by the reaction therein of a composition rendered insoluble by light rays, comprising rolls for advancing the paper material sheet or web while damp, in combination with means for artificially generating violet or ultra violet rays and applying such rays to said web or sheet in such manner as to cause the reaction of the substances carried by the web or sheet to render the same impervious.

8. In a paper making machine, in combination, paper making machine rolls for advancing the paper material web in process of producing paper therefrom, and means for generating and applying on both sides of said web the shorter wave length light rays to cause reaction of substances carried by said web to render the paper produced from said web impervious.

WILBUR L. WRIGHT.